United States Patent
Darmstadt et al.

(10) Patent No.: US 11,203,424 B2
(45) Date of Patent: Dec. 21, 2021

(54) SLEWING MECHANICAL POWER TRANSMISSIONS FOR ROTORCRAFT

(71) Applicant: The Boeing Company, Chicago, IL (US)

(72) Inventors: Patrick Darmstadt, Claymont, DE (US); Yiyi Zhang, Wallingford, PA (US); Mark J. Robuck, Chadds Ford, PA (US)

(73) Assignee: The Boeing Company, Chicago, IL (US)

( * ) Notice: Subject to any disclaimer, the term of this patent is extended or adjusted under 35 U.S.C. 154(b) by 323 days.

(21) Appl. No.: 16/351,971

(22) Filed: Mar. 13, 2019

(65) Prior Publication Data
US 2020/0290734 A1 Sep. 17, 2020

(51) Int. Cl.
| | | |
|---|---|---|
| B64C 27/22 | (2006.01) | |
| B64C 27/82 | (2006.01) | |
| F16H 57/02 | (2012.01) | |
| B64C 27/16 | (2006.01) | |

(52) U.S. Cl.
CPC ............. *B64C 27/82* (2013.01); *B64C 27/16* (2013.01); *B64C 27/22* (2013.01); *F16H 57/02* (2013.01); *B64C 2027/8236* (2013.01); *B64C 2027/8272* (2013.01)

(58) Field of Classification Search
CPC ......... B64C 27/12; B64C 27/22; B64C 27/82; B64C 2027/8236; F16H 57/02; F16H 2057/02043; F16H 2057/02082; B64D 35/00
See application file for complete search history.

(56) References Cited

U.S. PATENT DOCUMENTS

| | | | | |
|---|---|---|---|---|
| 2,420,764 | A * | 5/1947 | Zuck | B64C 27/04 244/51 |
| 2,959,373 | A | 11/1960 | Zuck | |
| 3,155,341 | A * | 11/1964 | Girard | B64C 27/26 244/7 R |
| 8,763,949 | B2 * | 7/2014 | Thomassey | B64C 27/82 244/17.13 |
| 8,777,152 | B2 * | 7/2014 | Thomassey | B64C 27/82 244/17.13 |
| 9,174,730 | B2 | 11/2015 | Litwinowicz et al. | |
| 10,167,078 | B2 * | 1/2019 | Waltner | B64C 27/82 |
| 10,315,758 | B2 * | 6/2019 | Adam | B64C 27/52 |
| 2010/0127114 | A1 * | 5/2010 | Nakayama | B64C 27/12 244/17.21 |
| 2012/0012693 | A1 * | 1/2012 | Thomassey | B64C 27/82 244/17.21 |
| 2016/0221675 | A1 * | 8/2016 | Adam | B64C 27/82 |
| 2017/0225778 | A1 * | 8/2017 | Waltner | B64C 5/10 |

* cited by examiner

*Primary Examiner* — Richard R. Green
*Assistant Examiner* — Michael A. Fabula
(74) *Attorney, Agent, or Firm* — Duft & Bornsen, PC

(57) ABSTRACT

A mechanical power transmission that pivots about an axis to vary an angle between an input shaft and an output shaft. The mechanical power transmission includes an input gear having an input shaft that couples to a drive shaft, an output gear having an output shaft that couples to a tail rotor, a first intermediate gear rotationally coupled to the input gear, and a second intermediate gear rotationally coupled to the output gear. The mechanical power transmission further comprises a shaft that mechanically couples the first intermediate gear with the second intermediate gear, where a centerline of the shaft is coincident with the axis.

20 Claims, 18 Drawing Sheets

SLEWING MECHANICAL POWER TRANSMISSIONS FOR ROTORCRAFT

This invention was made with Government support under W911W6-16-2-0010 awarded by Department of Defense. The government has certain rights in this invention.

FIELD

This disclosure relates to the field of mechanical power transmissions and, in particular, to mechanical power transmissions that transmit power to tail rotors of rotorcraft.

BACKGROUND

A helicopter is a rotorcraft whose rotors are driven by a power plant during flight operations to allow the helicopter to take off vertically, hover, move forward, move backward, move laterally, and to land vertically. Helicopters with a single main rotor use a tail rotor to compensate for the torque generated by the main rotor during flight operations.

In helicopters, a tail boom extends from a fuselage and includes a tail rotor on an end of the tail boom. The tail boom operates as a moment arm for the thrust generated by the tail rotor. In order for the tail rotor to prevent the helicopter from yawing due to the torque generated by the main rotor, the thrust generated by the tail rotor is perpendicular to the tail boom.

A drive system for a tail rotor typically includes one or more drive shafts that transmit mechanical power from the power plant to the tail rotor. At the end of the tail boom, an angled drive gearbox provides an angled drive for the tail rotor. When the tail rotor is not aligned along the long axis of the drive shaft(s), a short intermediate shaft may be used to transmit power from an intermediate gearbox to the angled drive gearbox for the tail rotor.

While a typical drive system for a tail rotor may operate sufficiently for most use cases, the relationship between the drive shaft(s), the tail rotor, and/or the intermediate gearbox between the drive shafts is fixed by design and does not change during flight operations. This precludes the implementation of variable geometry drive systems, which may be useful to enhance the flight capabilities of helicopters.

Thus, there is a need to provide improvements to the drive systems for tail rotors, especially in cases where enhanced flight capabilities for helicopters are desired.

SUMMARY

Embodiments described herein provide for a mechanical power transmission that pivots about an axis to vary an angle between an input shaft and an output shaft. The mechanical power transmission may be used between a tail rotor and a drive shaft to vary an orientation of the tail rotor.

One embodiment comprises a mechanical power transmission that installs between a tail rotor and a drive shaft and pivots about an axis. The mechanical power transmission includes an input gear having an input shaft that couples to the drive shaft, an output gear having an output shaft that couples to the tail rotor, a first intermediate gear rotationally coupled to the input gear, and a second intermediate gear rotationally coupled to the output gear. The mechanical power transmission further comprises a shaft that mechanically couples the first intermediate gear with the second intermediate gear, where a centerline of the shaft is coincident with the axis.

Another embodiment comprises a mechanical power transmission that installs between a tail rotor and a drive shaft and pivots about an axis. The mechanical power transmission includes a first housing that is fixed to a tail boom, a second housing that is rotationally coupled to the first housing and pivots about the axis, and an internal drive assembly disposed within the first housing and the second housing that rotationally couples the drive shaft to the tail rotor.

Another embodiment comprises a tail boom of a helicopter. The tail boom includes a drive shaft having a first end and a second end, and a mechanical power transmission. The mechanical power transmission pivots about an axis, and includes an input gear, an output gear, a first intermediate gear, a second intermediate gear, and a shaft. The input gear has an input shaft that is coupled to the drive shaft. The output gear has an output shaft that couples to the tail rotor. The first intermediate gear is rotationally coupled to the input gear. The second intermediate gear is rotationally coupled to the output gear. The shaft mechanically couples the first intermediate gear with the second intermediate gear and has a centerline that is coincident with the axis.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
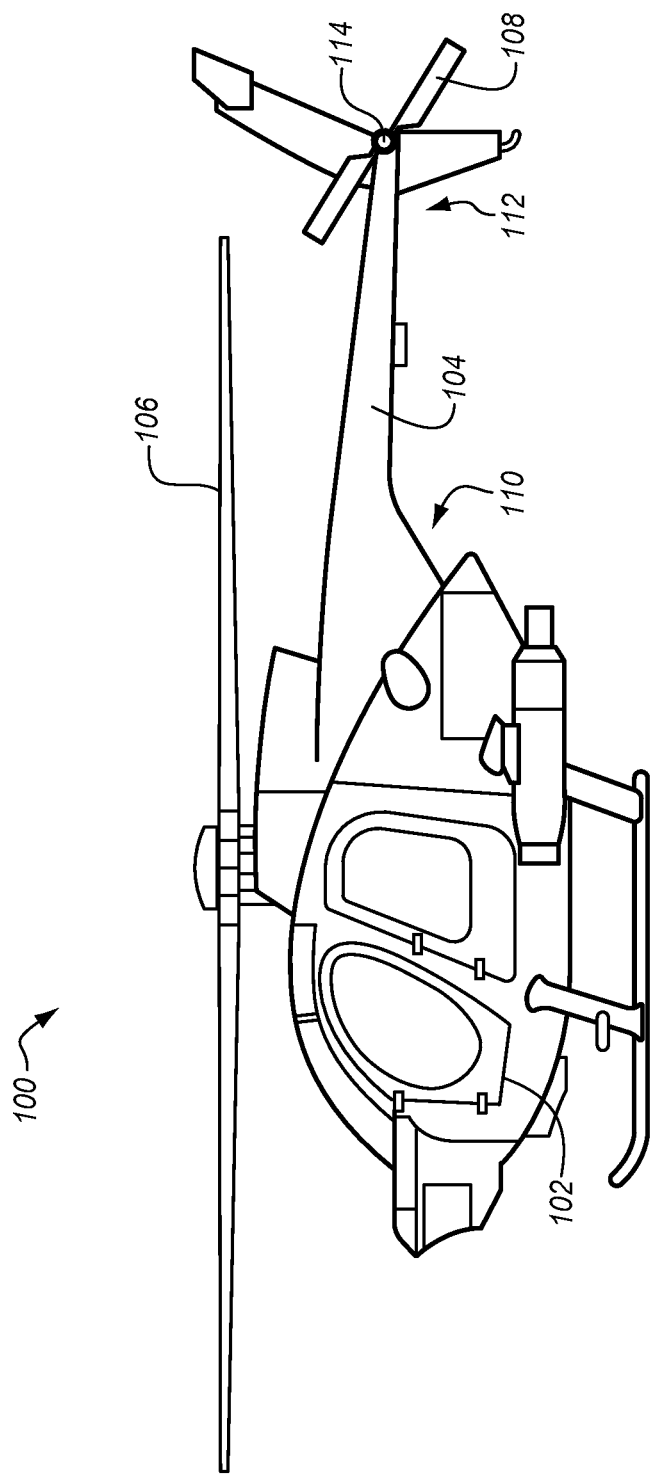
FIG. 1 is a side view of a helicopter in an illustrative embodiment.

FIG. 1 is a side view of a helicopter 100 in an illustrative embodiment. In this embodiment, helicopter 100 includes a fuselage 102, a tail boom 104 that has a first end 110 coupled to fuselage 102, a main rotor 106, and a tail rotor 108 proximate to a second end 112 of tail boom 104. Main rotor 106 provides lift to helicopter 100. In FIG. 1, helicopter 100 includes a single main rotor 106. In order to compensate for a yaw induced upon helicopter 100 from main rotor 106, tail rotor 108 provides a substantially perpendicular thrust with respect to tail boom 104. In this embodiment, helicopter 100 includes a mechanical power transmission 114, which is used to pivot tail rotor 108 away from the orientation illustrated in FIG. 1.

Figure 2:
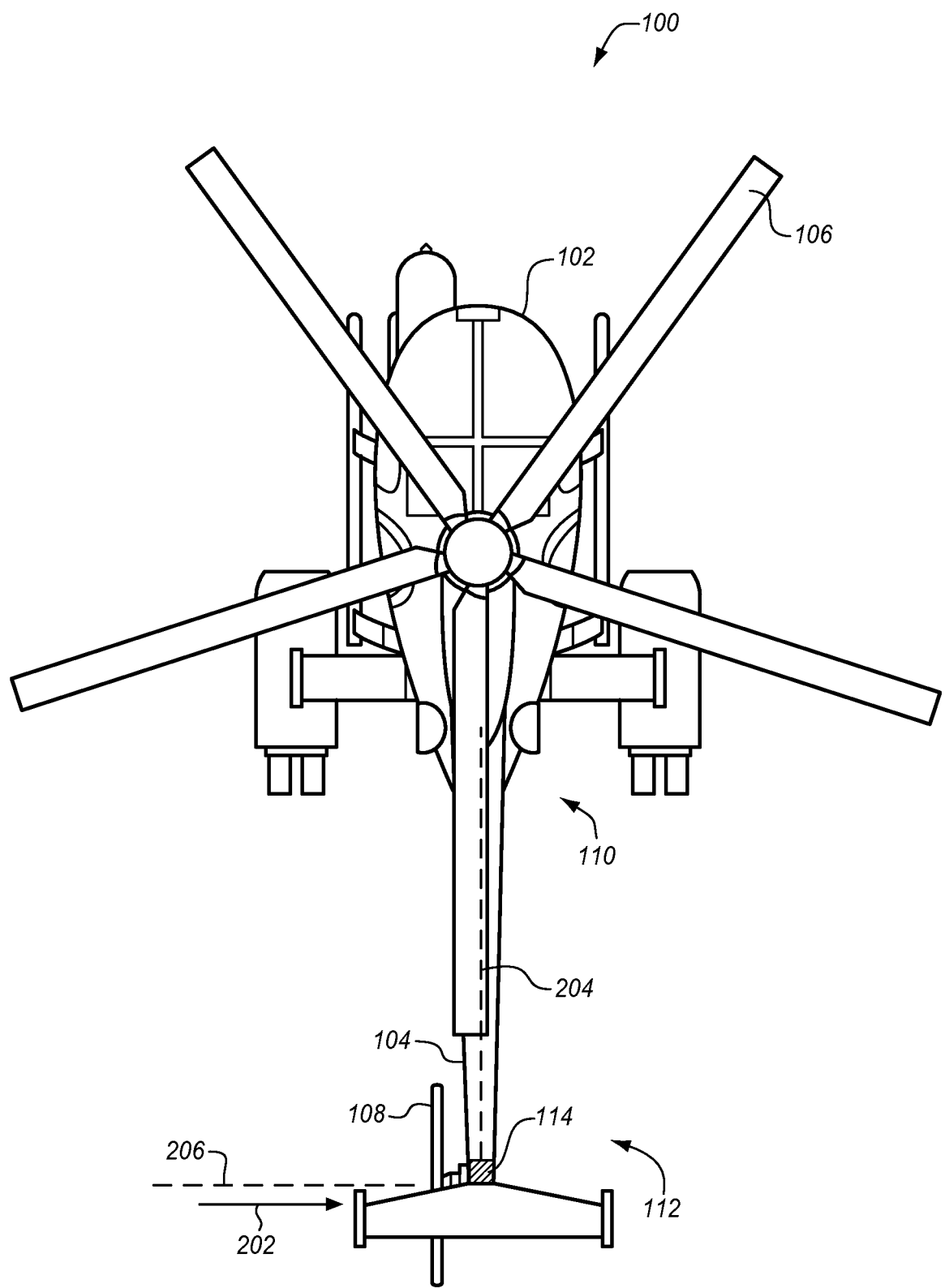
FIG. 2 is a top view of the helicopter of FIG. 1 in an illustrative embodiment.

FIG. 2 is a top view of helicopter 100 in an illustrative embodiment. In this embodiment, tail rotor 108 is oriented at a first position 206 that is substantially parallel to tail boom 104. More specifically, first position 206 is substantially parallel to an axis 204 through tail boom 104 that traverses from first end 110 to second end 112. This orientation enables tail rotor 108 to provide thrust 202 that is substantially perpendicular to axis 204 of tail boom 104. The orientation of tail rotor 108 illustrated in FIG. 2 is common to modern helicopters that only include a single main rotor 106. For example, first position 206 of tail rotor 108 illustrated in FIG. 2 enables helicopter 100 to perform a hover operation during flight operations.

Figure 3:
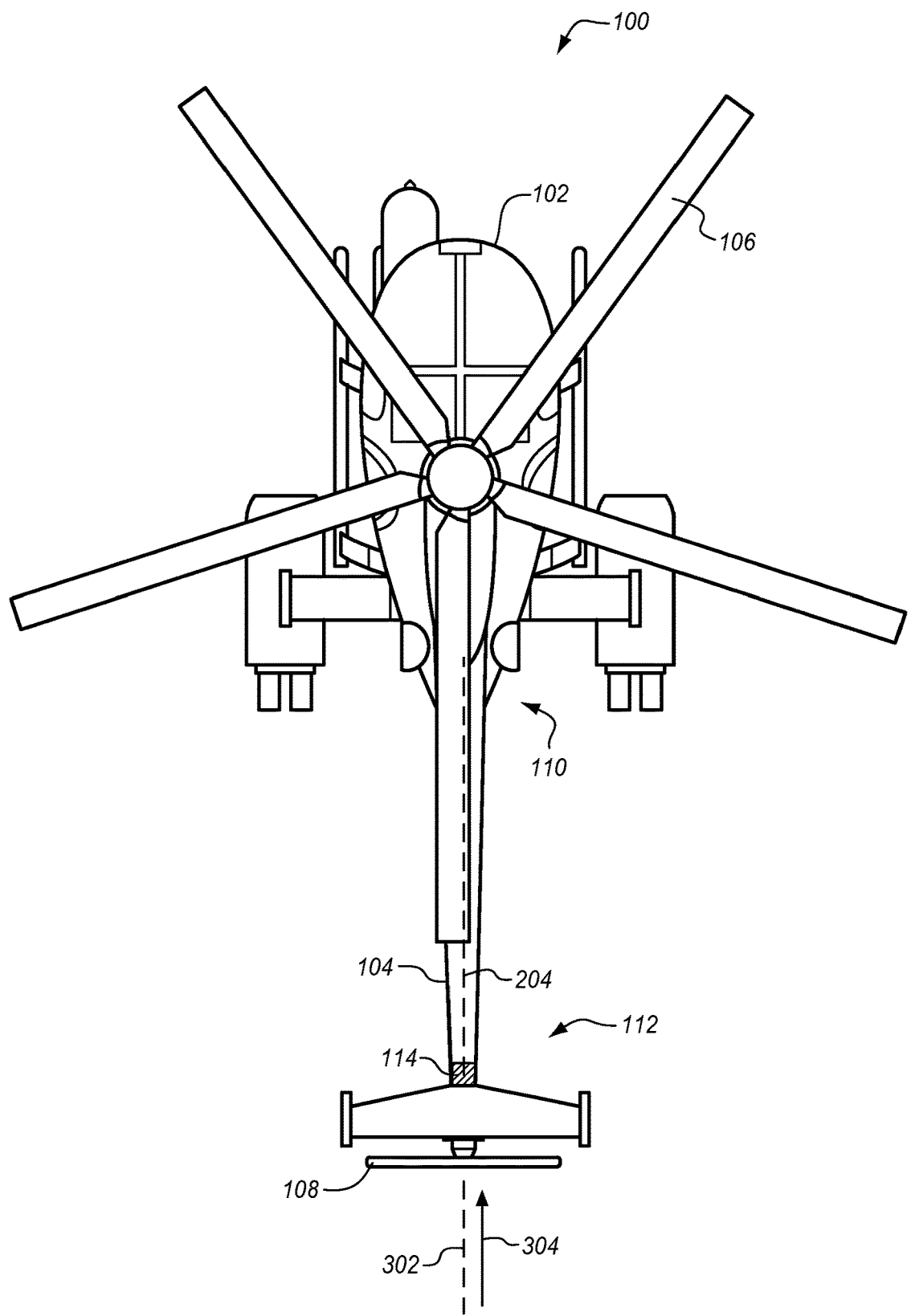
FIG. 3 is another top view of the helicopter of FIG. 1 in an illustrative embodiment.

FIG. 3 is another top view of helicopter 100 in an illustrative embodiment. In this embodiment, tail rotor 108 is oriented at a second position 302 that is substantially perpendicular to tail boom 104. More specifically, second position 302 is substantially perpendicular to axis 204 through tail boom 104. In this orientation, tail rotor 108 provides forward thrust 304 to helicopter 100, which allows helicopter 100 to fly at a higher speed as compared to the orientation of tail rotor 108 illustrated in FIG. 2.

In the embodiments described herein, mechanical power transmission 114 is configured to pivot tail rotor 108 away from first position 206 illustrated in FIG. 2 in order to provide a forward thrust 304 to helicopter 100 during flight operations. The ability of tail rotor 108 to pivot away from first position 206 illustrated in FIG. 2 is achieved utilizing mechanical power transmission 114 that is both coupled to tail rotor 108 and is pivotable.

Figure 4:
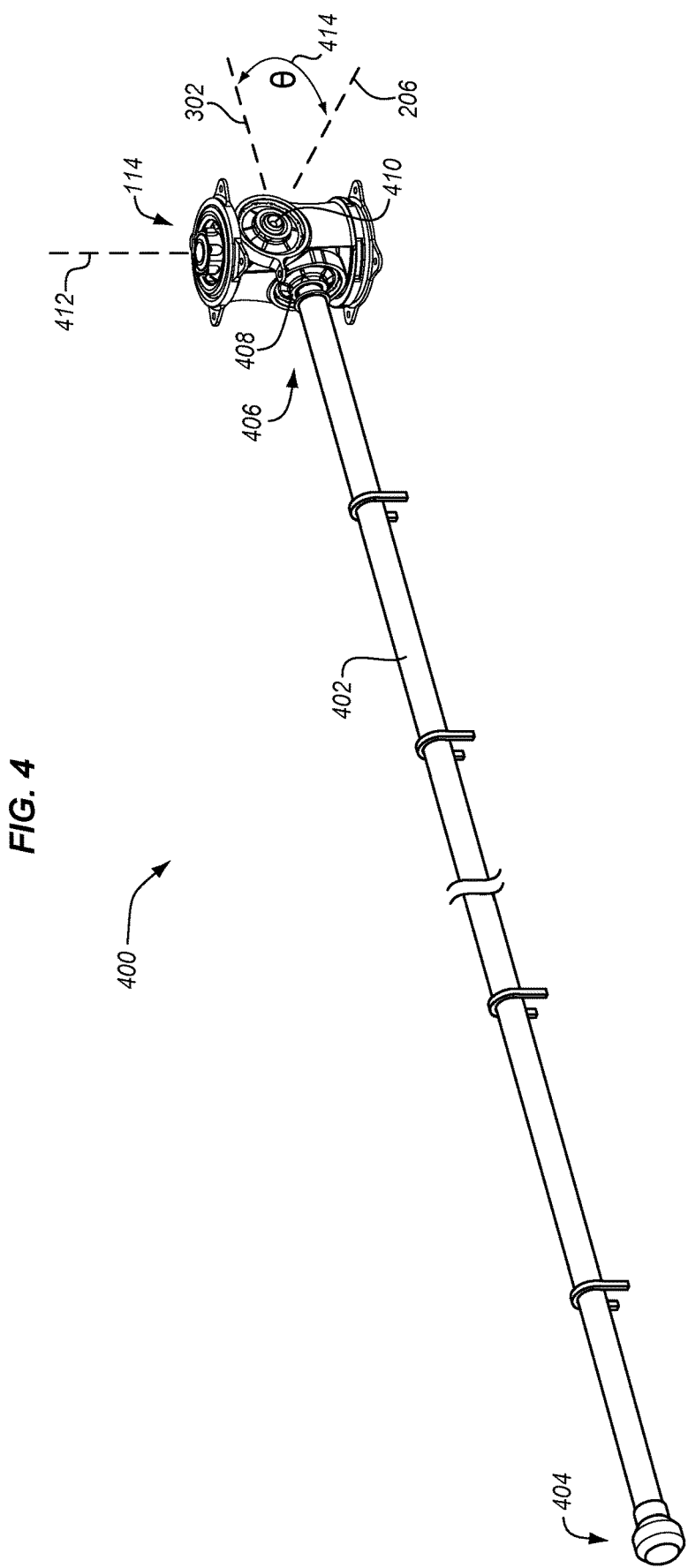
FIG. 4 depicts a tail rotor drive system for the helicopter of FIG. 1 in an illustrative embodiment.

FIG. 4 is a perspective view of a tail rotor drive system 400 for helicopter 100 in an illustrative embodiment. In particular, tail rotor drive system 400 may be disposed within tail boom 104 of helicopter 100 between first end 110 of tail boom 104 and second end 112 of tail boom 104. In this embodiment, tail rotor drive system 400 includes a drive shaft 402 having a first end 404 and a second end 406. First end 404 of drive shaft 402 is typically coupled to a transmission (not shown) within fuselage 102 of helicopter 100 that receives mechanical power from a power plant (not shown) of helicopter 100. The transmission delivers the mechanical power to both main rotor 106 and tail rotor 108.

In this embodiment, second end 406 of drive shaft 402 is coupled to mechanical power transmission 114. More specifically, second end 406 of drive shaft 402 is coupled to an input shaft 408 of mechanical power transmission 114. Further, an output shaft 410 of mechanical power transmission 114 is coupled to tail rotor 108. Mechanical power transmission 114 pivots about an axis 412 between first position 206 and second position 302 in order to move tail rotor 108 as illustrated in FIGS. 2-3. More specifically, mechanical power transmission 114 pivots about axis 412 in order to vary an angle 414 between first position 206 and second position 302. In some embodiments, angle 414 may vary between ninety degrees and zero degrees.

Figure 5:
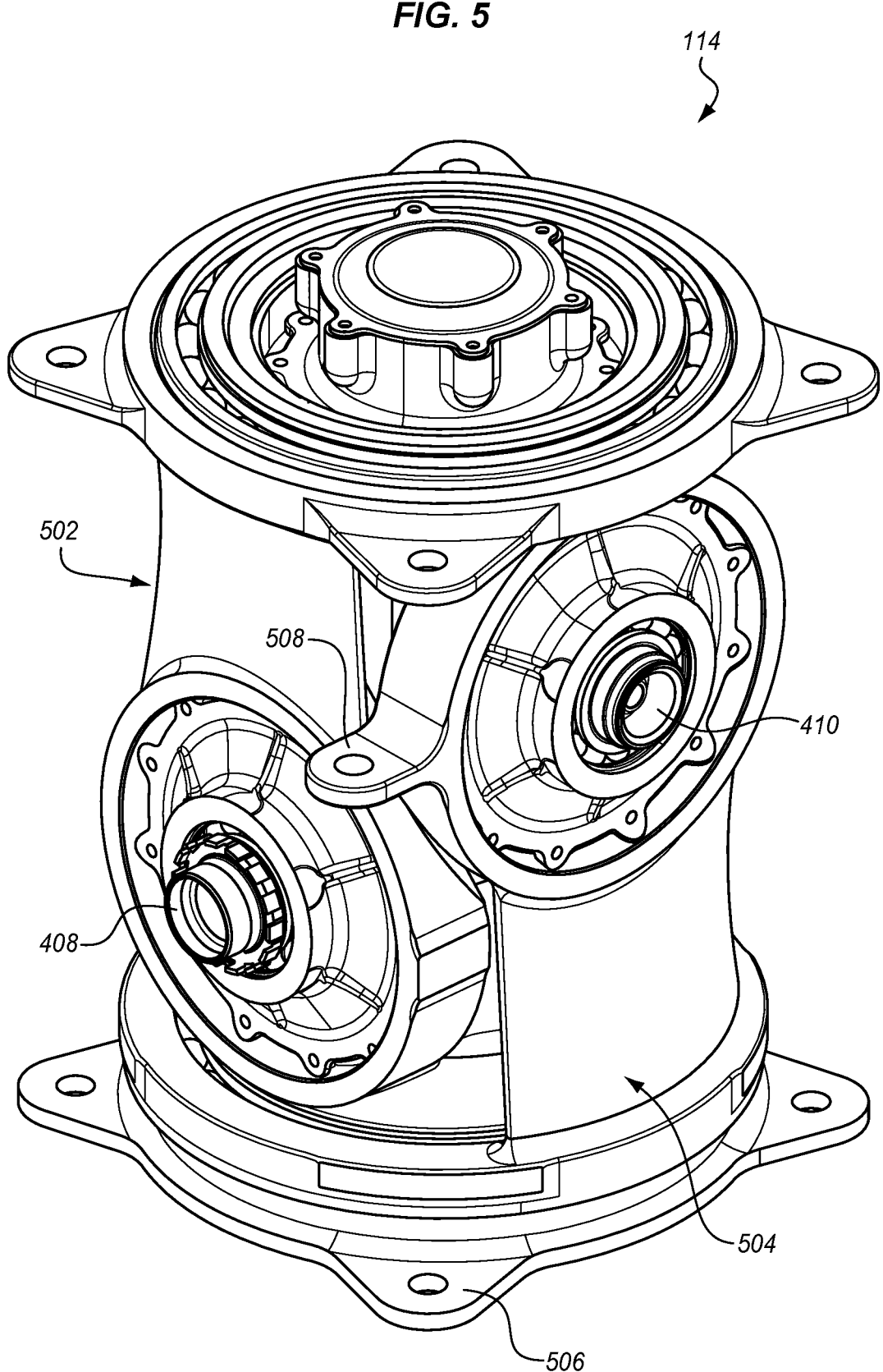
FIG. 5 depicts a mechanical power transmission of the tail rotor drive system of FIG. 4 oriented in a first position in an illustrative embodiment.

FIG. 5 is a perspective view of mechanical power transmission 114 of tail rotor drive system 400 oriented in first position 206 in an illustrative embodiment. In this orientation, tail rotor 108 is positioned as illustrated in FIG. 2. In this embodiment, mechanical power transmission 114 includes a first housing 502 that is rotationally coupled to a second housing 504. Mechanical power transmission 114 further includes a base member 506 that may be fixed or rotationally coupled to first housing 502, and an actuator lug 508 on second housing 504 that is used to rotate second housing 504 with respect to first housing 502. Second housing 504 may provide mechanical support to a tail rotor structure (not shown), which includes tail rotor 108. The tail rotor structure may, for instance, rotate along with second housing 504 as second housing 504 rotates with respect to first housing 502. Further, the design of mechanical power transmission 114 is configured to support and transmit the mechanical loads from tail rotor 108 for any orientation of output shaft 410. Although not explicitly shown or described with respect the following figures, mechanical power transmission 114 may include seals, retainers, or other features as a matter of design. Thus, the following figures and discussion may omit other features for purposes of discussion. Therefore, mechanical power transmission 114 is not limited to the various elements described below.

Figure 6:
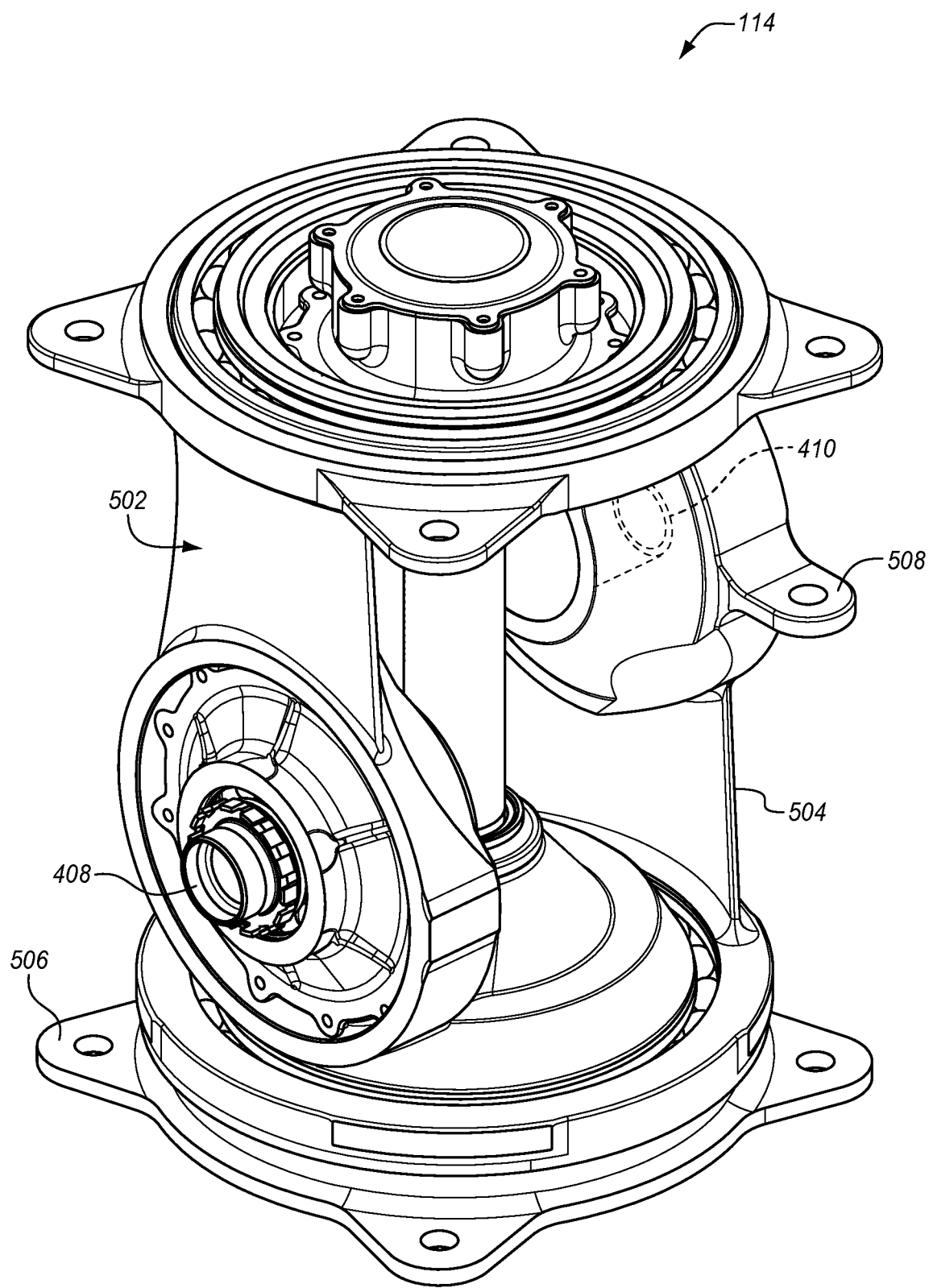
FIG. 6 depicts a mechanical power transmission of the tail rotor drive system of FIG. 4 oriented in a second position in an illustrative embodiment.

FIG. 6 is a perspective view of mechanical power transmission 114 of tail rotor drive system 400 oriented in second position 302 in an illustrative embodiment. In this orientation, tail rotor 108 is positioned as illustrated in FIG. 3. Further, second housing 504 is rotated with respect to first housing 502.

Figure 7:
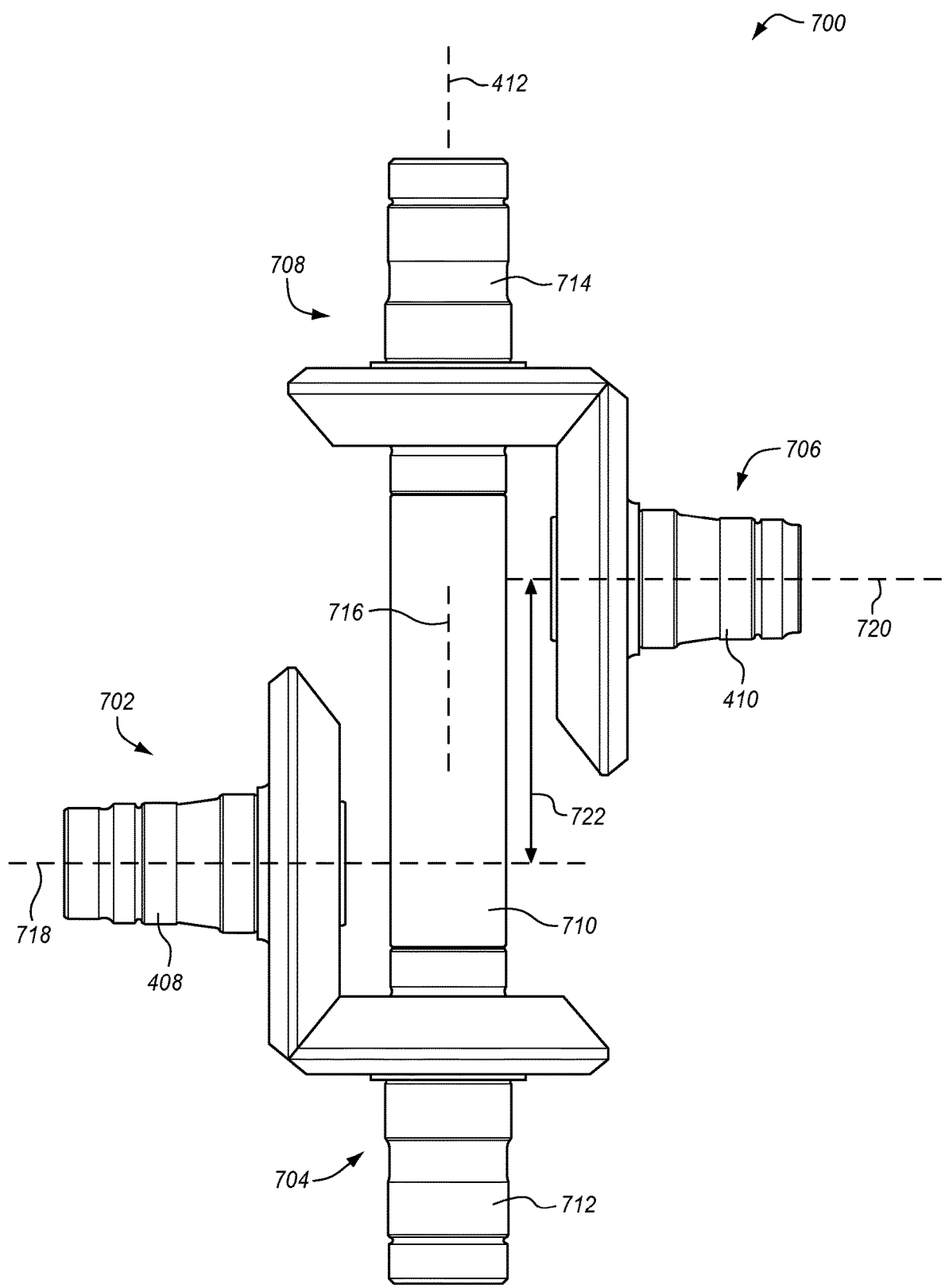
FIGS. 7-17 depict various elements of the mechanical power transmission of the tail rotor drive system of FIG. 4 in illustrative embodiments.

FIGS. 7-17 depict various elements of mechanical power transmission 114 of tail rotor drive system 400 in illustrative embodiments. In particular, FIG. 7 is a perspective view of an internal drive assembly 700 for mechanical power transmission 114 in an illustrative embodiment. In the embodiment illustrated in FIG. 7, internal drive assembly 700 includes in input gear 702 that rotationally couples to a first intermediate gear 704, and an output gear 706 that rotationally couples to a second intermediate gear 708. A shaft 710 mechanically couples first intermediate gear 704 with second intermediate gear 708. Input gear 702 includes input shaft 408 that mechanically couples to second end 406 of drive shaft 402. First intermediate gear 704 includes a shaft 712. Output gear 706 includes output shaft 410 that mechanically couples to tail rotor 108. Second intermediate gear 708 includes a shaft 714. In this embodiment, a centerline 716 of shaft 710 is coincident with axis 412 of mechanical power transmission 114. As input shaft 408 rotates, first intermediate gear 704, shaft 710, and second intermediate gear 708 transfer the rotation to output shaft 410. As mechanical power transmission 114 pivots about axis 412, the orientation of shaft 710 remains constant because centerline 716 of shaft 710 is coincident with axis 412. However, the orientation of output shaft 410 with respect to input shaft 408 changes, as illustrated in FIGS. 5-6.

In some embodiments, a centerline 718 of input shaft 408 and/or a centerline 720 of output shaft 410 are perpendicular to axis 412. Further, centerline 718 and centerline 720 may have a separation 722 that is less than about 7 inches. This enables mechanical power transmission 114 to achieve a compact size. However, separation 722 is generally based upon the rated power capability of mechanical power transmission 114, with higher power ratings utilizing heavier gears and shafts, thereby increasing separation 722 over 7 inches.

As discussed previously, mechanical power transmission 114 includes a first housing 502 and a second housing 504 that are rotatably coupled together. FIGS. 8-11 illustrate various elements of mechanical power transmission 114 that are included within first housing 502, while FIGS. 12-15 illustrate various elements of mechanical power transmission 114 that are included within second housing 504.

Figure 8:
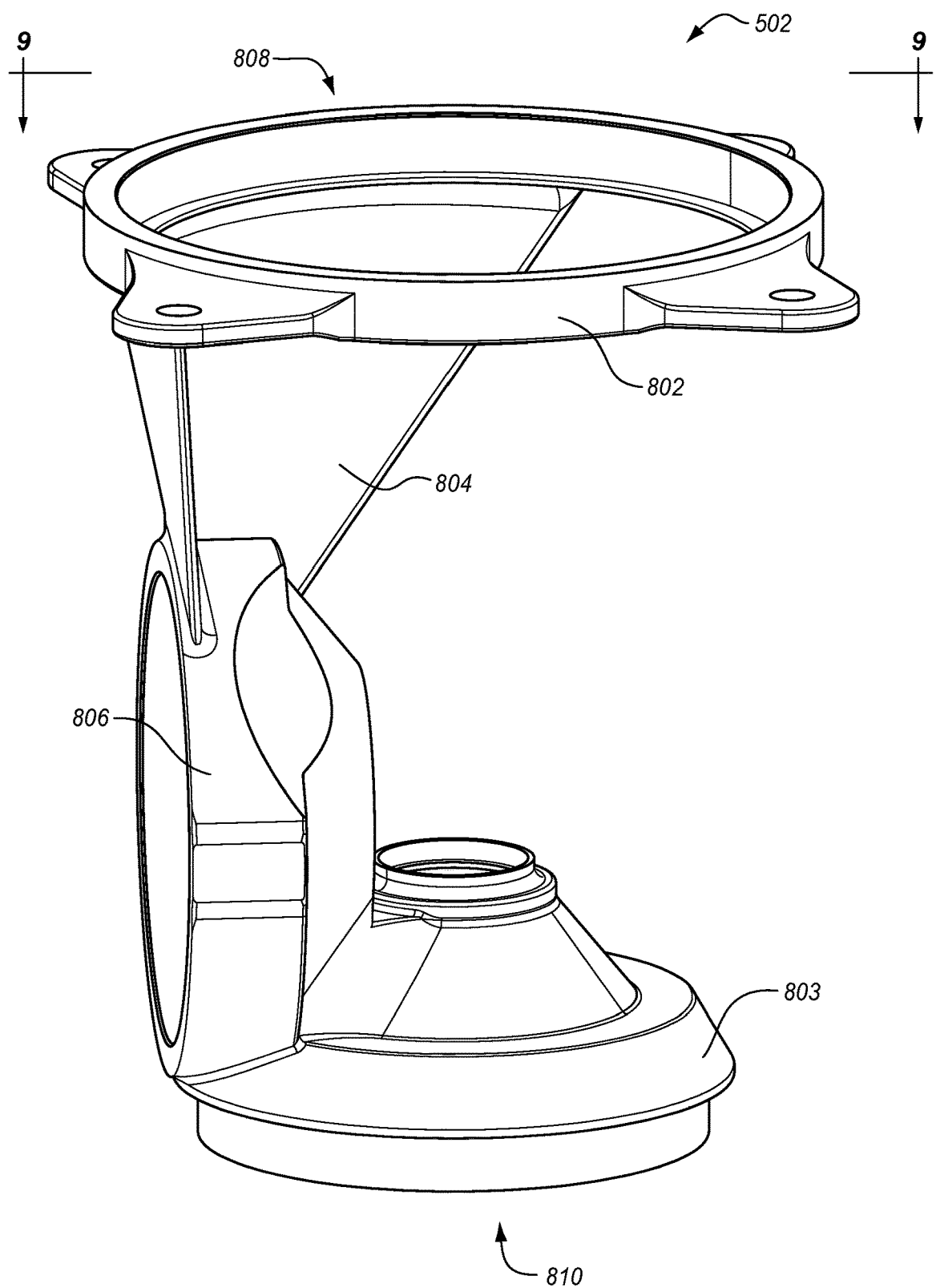

FIG. 8 is a perspective view of first housing 502 for mechanical power transmission 114 in an illustrative embodiment. First housing 502 has opposing end members 802-803 connected by a connecting member 804. Connecting member 804 includes a transverse member 806. End member 802 is disposed at a first end 808 of first housing 502 and end member 803 is located at a second end 810 of first housing 502. In this embodiment, transverse member 806 is located proximate to end member 803.

Figure 9:
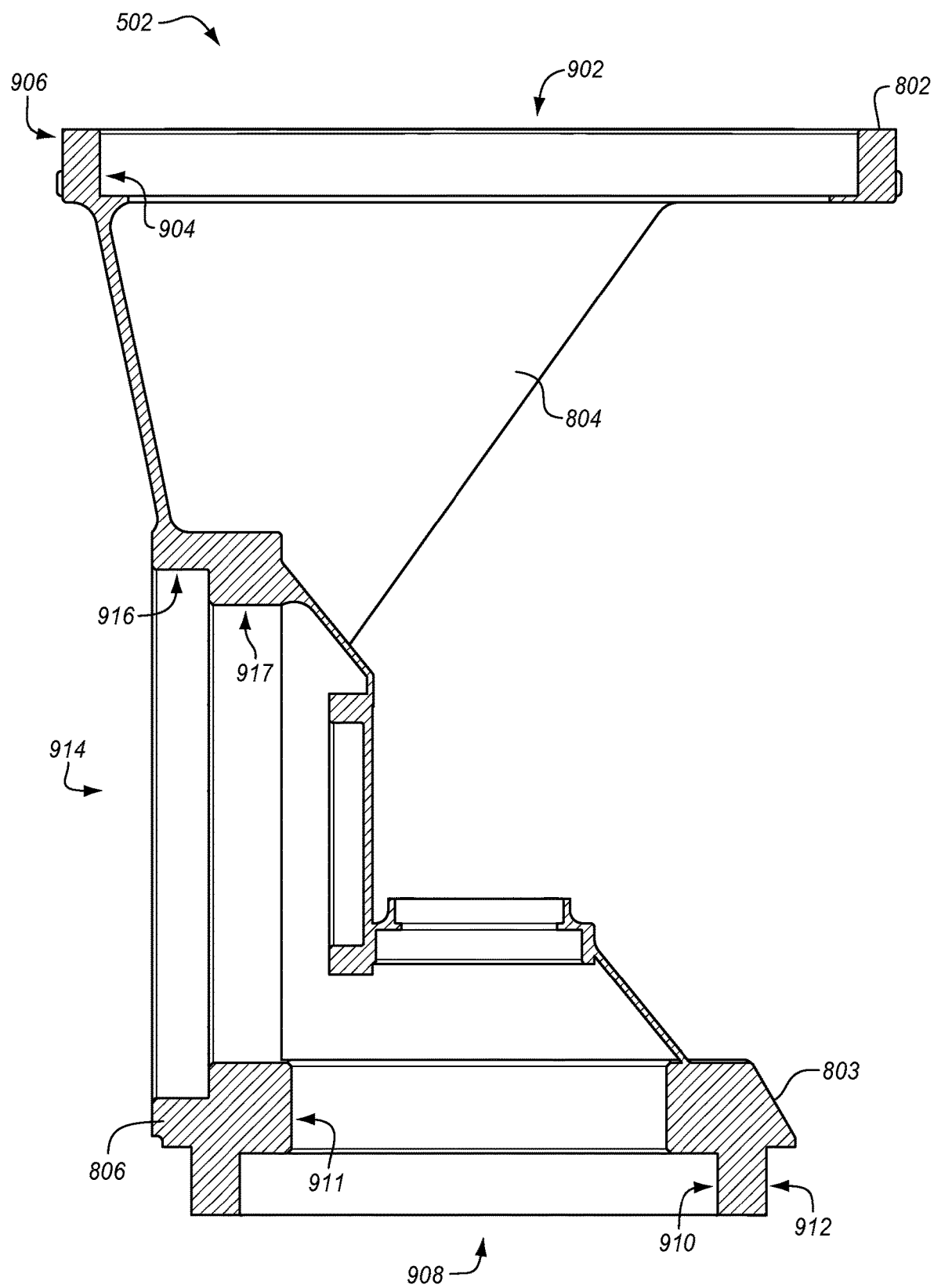

FIG. 9 is a cross sectional view of first housing 502 as depicted in FIG. 8 in an illustrative embodiment. The view in FIG. 9 is across the cutting plane 9-9 in FIG. 8. FIG. 9 illustrates that end member 802 includes an opening 902 that is circular in shape and substantially defined by an inner circumference 904. End member 802 also includes an outer circumference 906 that opposes inner circumference 904. End member 803 also has an opening 908 that is circular in shape and substantially defined by a pair of inner circumferences 910-911. Inner circumferences 910-911 are coaxial with each other and differ in diameter. End member 803 further includes an outer circumference 912 which opposes inner circumference 910. Transverse member 806 also includes an opening 914 that is circular in shape and substantially defined by a pair of inner circumferences 916-917 that are coaxial with each other and differ in diameter.

Figure 10:
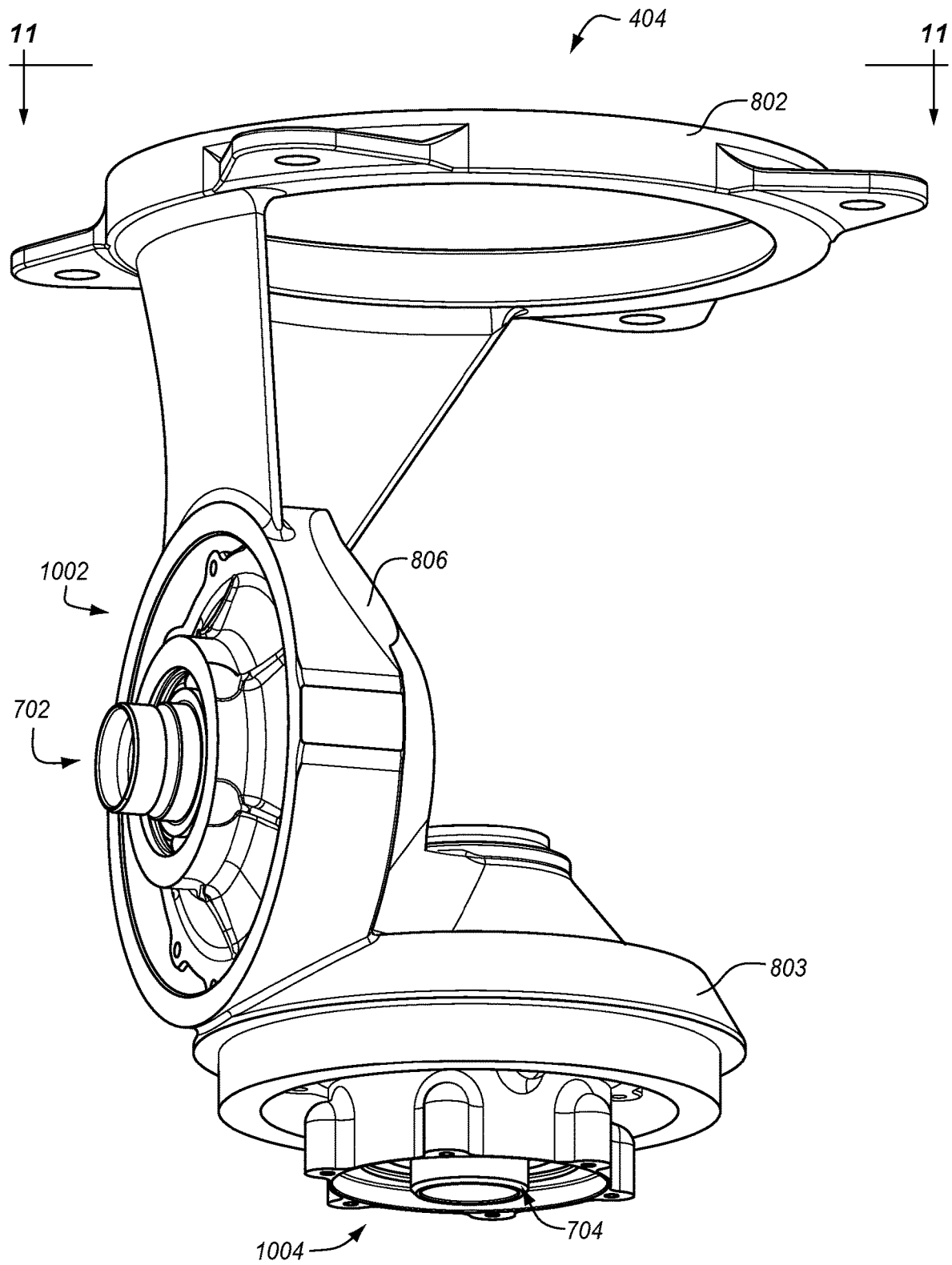

FIG. 10 is a perspective view of first housing 502 in another illustrative embodiment. In this embodiment, first housing 502 includes input gear 702, first intermediate gear 704, a first bearing assembly 1002, and a second bearing assembly 1004. First bearing assembly 1002 rotationally couples input gear 702 to first housing 502 within opening 914 of transverse member 806. Second bearing assembly 1004 rotationally couples first intermediate gear 704 to first housing 502 within opening 908 of end member 803.

Figure 11:
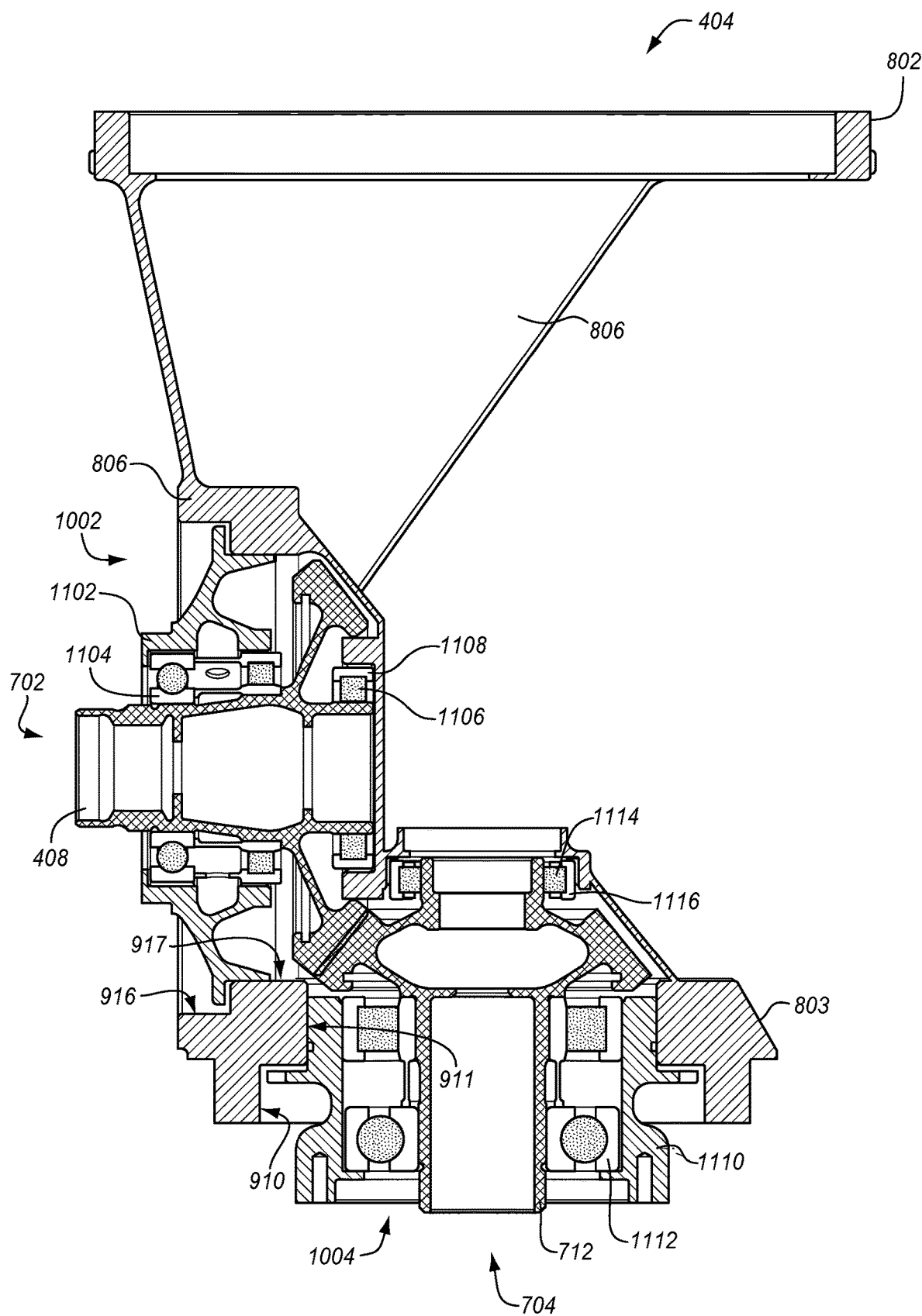

FIG. 11 is a cross-sectional view of first housing 502 as depicted in FIG. 10. The view in FIG. 11 is across the cutting plate 11-11 in FIG. 10. In this embodiment, first bearing assembly 1002 includes a retainer 1102 which mates with inner circumference 916-917 of transverse member 806. First bearing assembly 1002 further includes a bearing 1104, which is disposed between input shaft 408 and retainer 1102. First bearing assembly 1002 also includes a bearing 1106. Bearing 1106 is disposed between input shaft 408 and a retaining ring 1108 located within transverse member 806 of first housing 502.

Further in this embodiment, second bearing assembly 1004 includes a retainer 1110 which mates with inner circumference 910-911 of end member 803. Second bearing assembly 1004 further includes a bearing 1112, which is disposed between shaft 714 and retainer 1110. Second bearing assembly 1004 also includes a bearing 1114. Bearing 1114 is disposed between shaft 714 and a retaining ring 1116 located within end member 803 of first housing 502.

Figure 12:
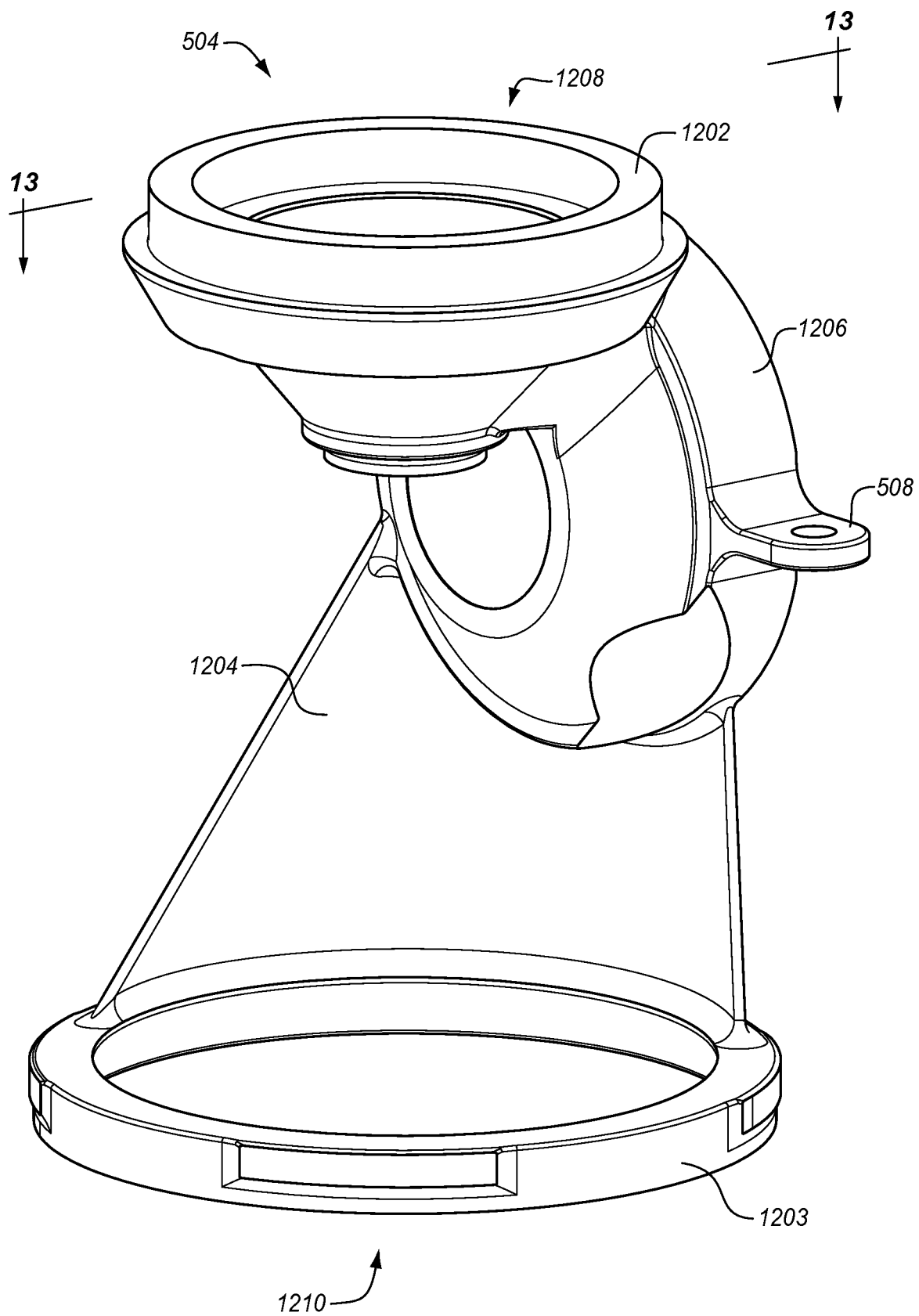

FIG. 12 is a perspective view of second housing 504 for mechanical power transmission 114 in an illustrative embodiment. In some embodiments, second housing 504 may be attached to and mechanically support a tail rotor structure that includes tail rotor 108 (not shown). In this embodiment, second housing 504 has opposing end members 1202-1203 connected by a connecting member 1204 that includes a transverse member 1206. End member 1202 is disposed at a first end 1208 of second housing 504 and end member 1203 is disposed at a second end 1210 of second housing 504. In this embodiment, transverse member 1206 is located proximate to end member 1202.

Figure 13:
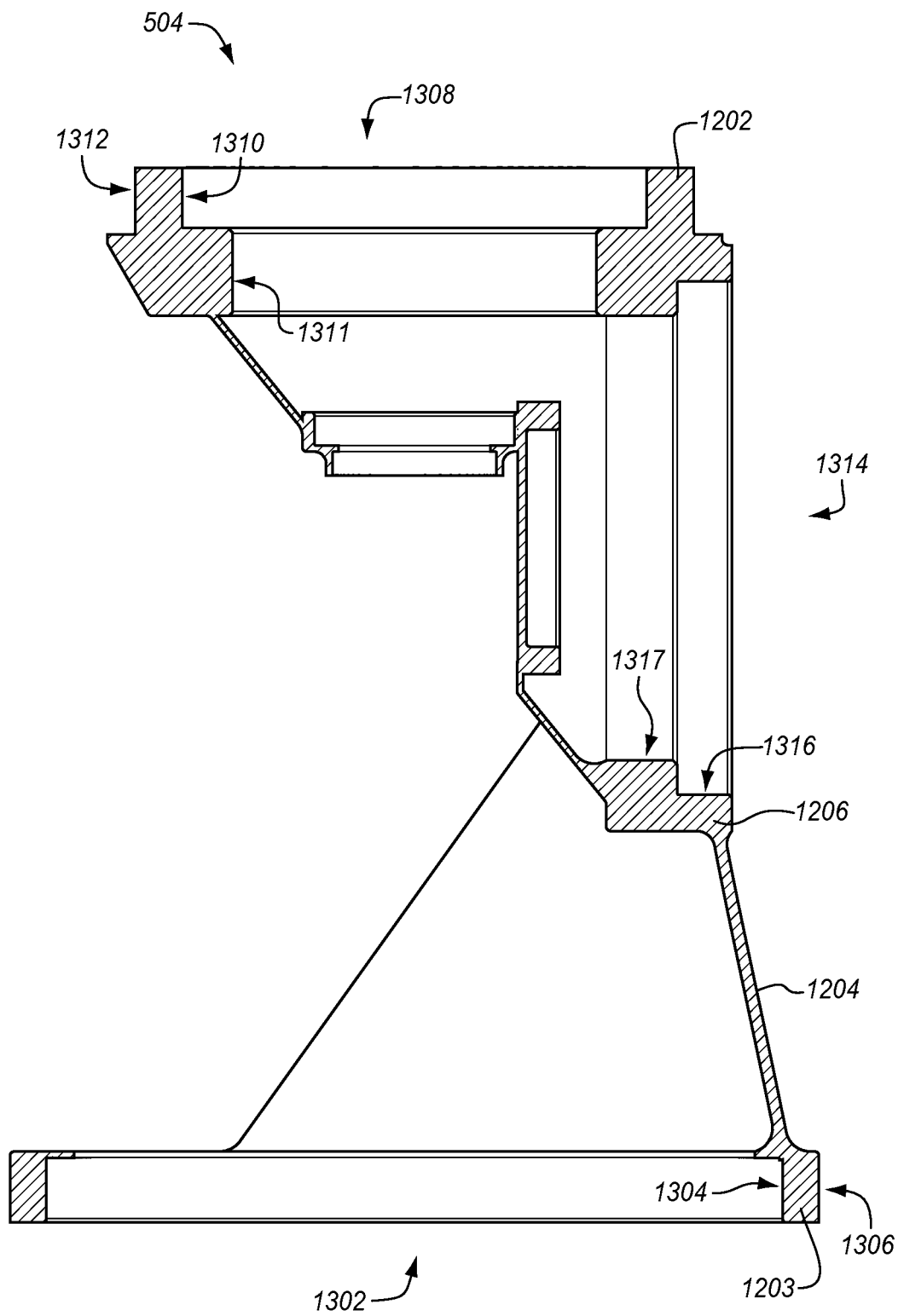

FIG. 13 is a cross sectional view of second housing 504 in an illustrative embodiment. The view in FIG. 13 is across the cutting plane 13-13 in FIG. 12. In this embodiment, end member 1203 includes an opening 1302 that is circular in shape and substantially defined by an inner circumference 1304. End member 1202 also includes an outer circumference 1306 that opposes inner circumference 1304. End member 1202 also has an opening 1308 that is circular in shape and substantially defined by a pair of inner circumferences 1310-1311. Inner circumferences 1310-1311 are coaxial with each other and differ in diameter. End member 1202 further includes an outer circumference 1312 which opposes inner circumference 1310. Transverse member 1206 also includes an opening 1314 that is circular in shape and substantially defined by a pair of inner circumferences 1316-1317 that are coaxial with each other and differ in diameter.

Figure 14:
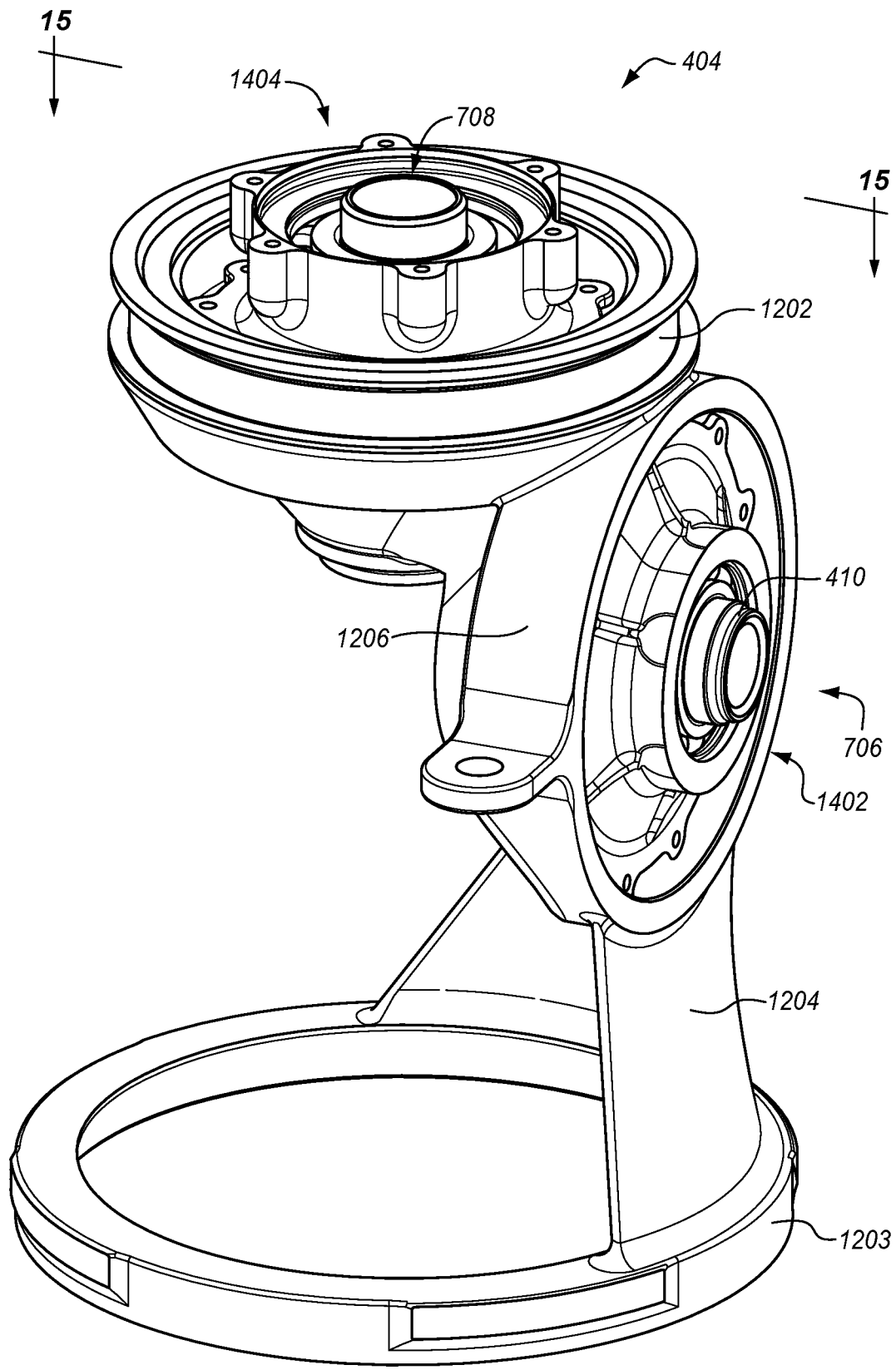

FIG. 14 is a perspective view of second housing 504 including output gear 706, second intermediate gear 708, a third bearing assembly 1402, and a fourth bearing assembly 1404 in an illustrative embodiment. Third bearing assembly 1402 rotationally couples output gear 706 to second housing 504 within opening 1314 of transverse member 1206. Fourth bearing assembly 1404 rotationally couples second intermediate gear 708 to second housing 504 within opening 1308 of end member 1202.

Figure 15:
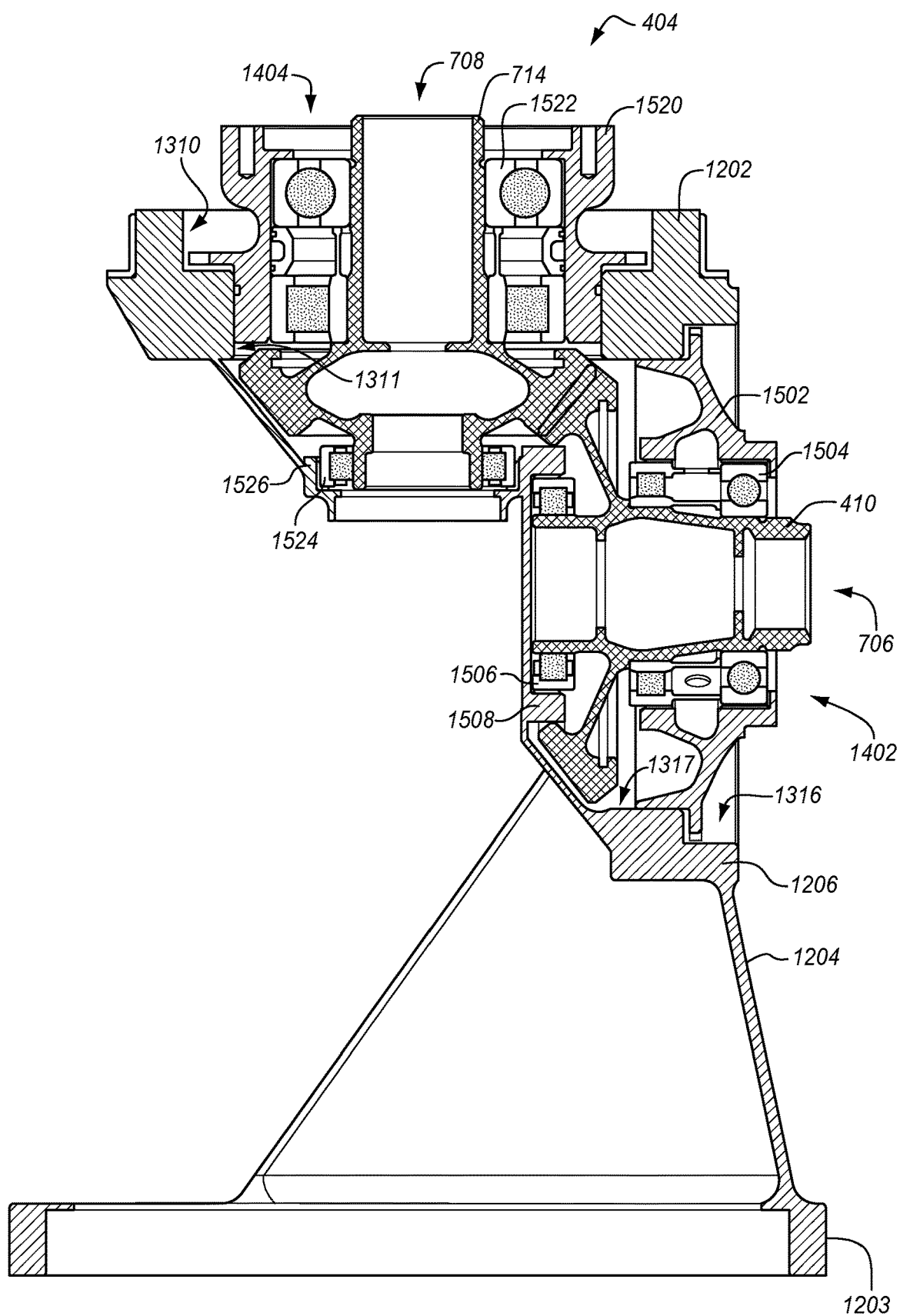

FIG. 15 is a cross-sectional view of second housing 504 as depicted in FIG. 14 in an illustrative embodiment. The view in FIG. 15 is across the cutting plane 15-15 in FIG. 14. In this embodiment, third bearing assembly 1402 includes a retainer 1502, which mates with inner circumferences 1316-1317 of transverse member 1206. Third bearing assembly 1402 further includes a bearing 1504, which is disposed between output shaft 410 and retainer 1502. Third bearing assembly 1402 also includes a bearing 1506 that disposed between output shaft 410 and a retaining ring 1508 located within transverse member 1206 of second housing 504.

Further in this embodiment, fourth bearing assembly 1404 includes a retainer 1520, which mates with inner circumferences 1310-1311 of end member 1202. Fourth bearing assembly 1404 further includes a bearing 1522, which is disposed between shaft 710 and retainer 1520. Fourth bearing assembly 1404 also includes a bearing 1524 that is disposed between shaft 714 and a retaining ring 1526 located within end member 1202 of second housing 504.

Figure 16:
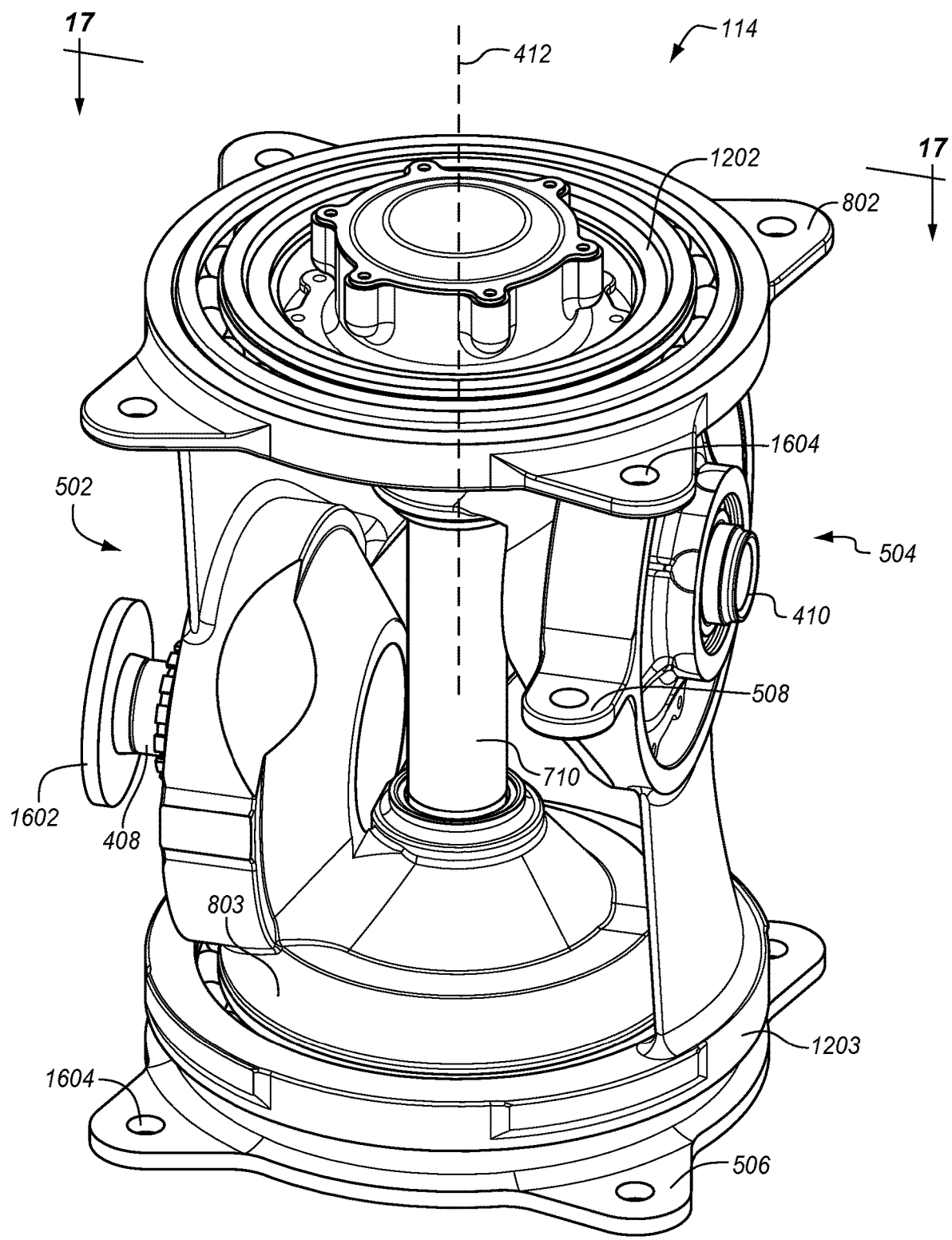

FIG. 16 is a perspective view of mechanical power transmission 114 in an illustrative embodiment. In particular, first housing 502 is rotationally coupled to second housing 504. In particular, end member 802 of first housing 502 is rotationally coupled to end member 1202 of second housing 504, and end member 803 of first housing 502 is rotationally coupled to end member 1203 of second housing 504. Also illustrated in FIG. 16, is an input coupler 1602, which couples to input shaft 408. Input coupler 1602 may be used to mechanically couple input shaft 408 with second end 406 of drive shaft 402. FIG. 16 further illustrates base member 506. Base member 506 may be rotational coupled or fixed to first housing 502 in different embodiments.

Because first housing 502 and second housing 504 are rotationally coupled together, the orientation of output shaft 410 with respect to input shaft 408 may be changed using actuator lug 508, which repositions second housing 504 with respect to first housing 502. Mounting holes 1604 in end member 802 and base member 506 may be used to secure mechanical power transmission 114 to a structure. In one embodiment, first housing 502 may secure to tail boom 104 and second housing 504 may attach and support a tail structure that provides mechanical support to tail rotor 108. In another embodiment, first housing 502 and second housing 504 may secure to tail boom 104. FIG. 16 further illustrates shaft 710, which mechanically couples first intermediate gear 704 to second intermediate gear 708.

Figure 17:
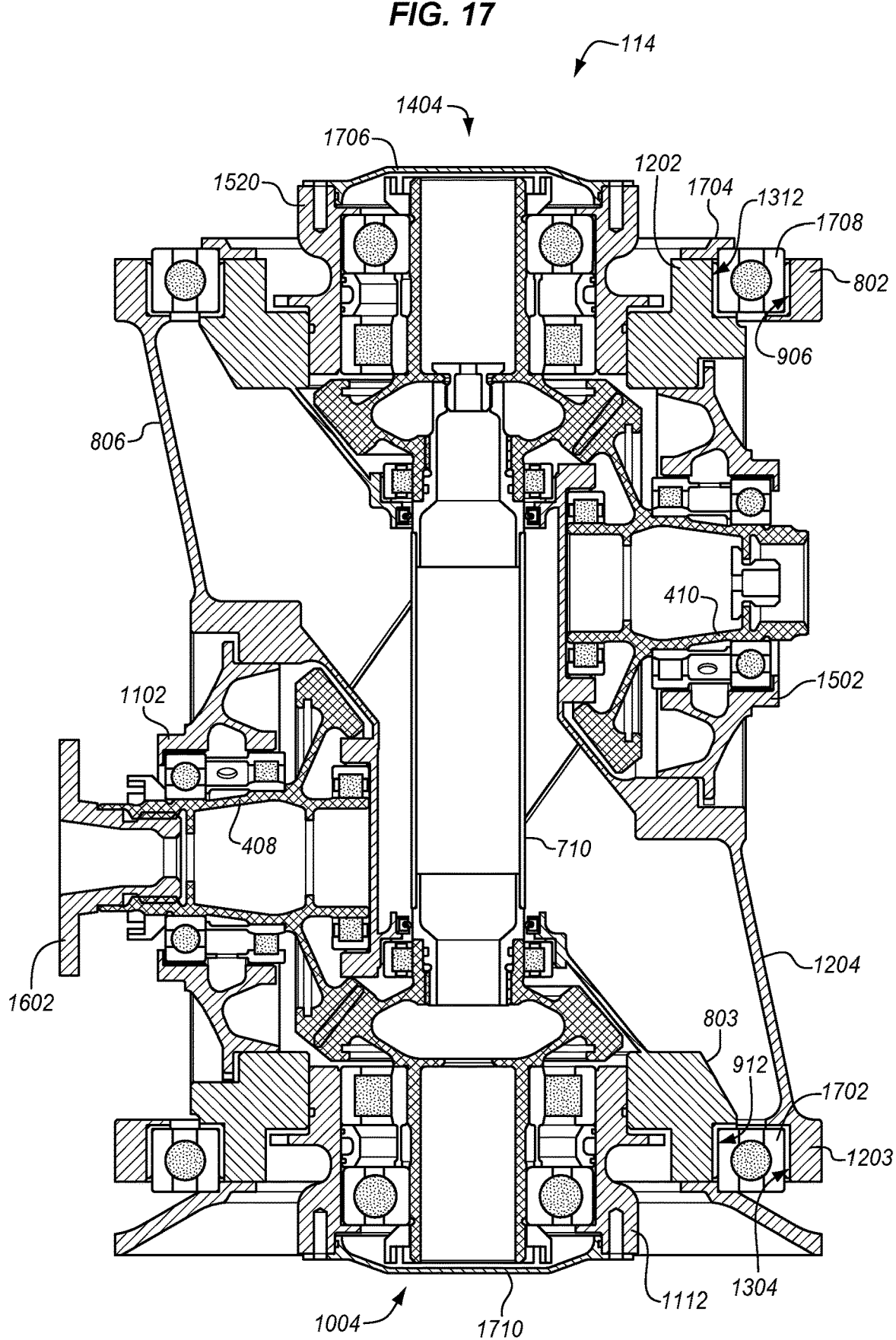

FIG. 17 is a cross-sectional view of mechanical power transmission 114 illustrated in FIG. 16 in an illustrative embodiment. The view in FIG. 17 is across the cutting plane 17-17 in FIG. 16. In this embodiment, a first bearing 1702 rotationally couples end member 1203 of second housing 504 with end member 803 of first housing 502. In particular, first bearing 1702 is disposed between inner circumference 1304 of end member 1203 and outer circumference 912 of end member 803. Further illustrated in FIG. 17 is a dust cover 1710, which protects second bearing assembly 1004.

Further in this embodiment, a second bearing 1708 rotationally couples end member 1202 of second housing 504 with end member 802 of first housing 502. In particular, second bearing 1708 is disposed between outer circumference 906 of end member 802 and outer circumference 1312 of end member 1202. Further illustrated in FIG. 17 is a dust cover 1706, which protects second bearing assembly 1004. Also illustrated in this embodiment is a retainer 1704, which secures second bearing 1708 in place.

Figure 18:
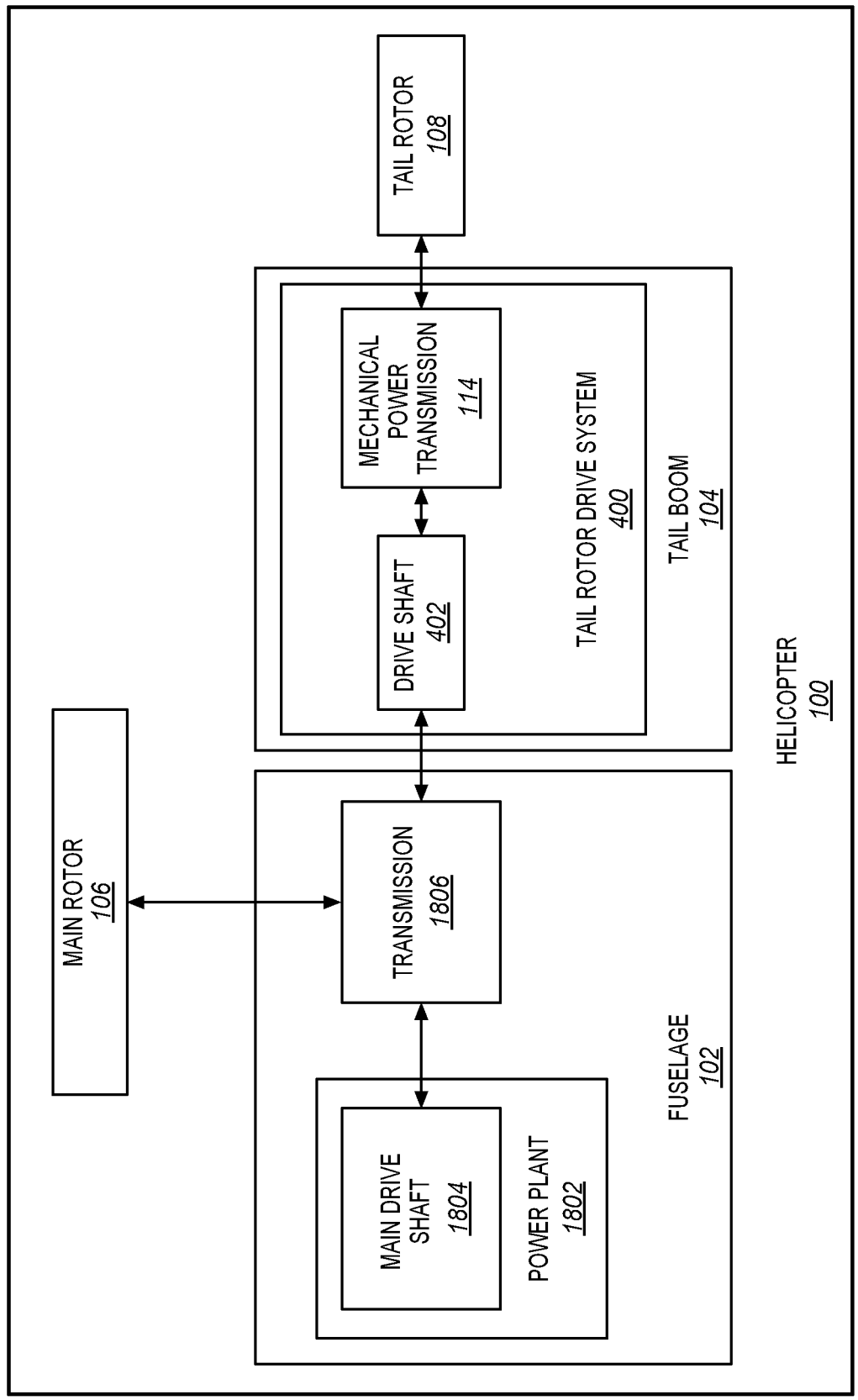
FIG. 18 is a block diagram of the helicopter of FIG. 1 in another illustrative embodiment.

FIG. 18 is a block diagram of helicopter 100 in an illustrative embodiment. In this embodiment, helicopter 100 depicts fuselage 102 and tail boom 104. Tail rotor drive system 400 is disposed within tail boom 104. Tail rotor 108 is coupled to mechanical power transmission 114. A power plant 1802 is disposed within fuselage 102 that includes a main drive shaft 1804. Helicopter 100 in this embodiment further includes a transmission 1806 coupled to main drive shaft 1804. Transmission 1806 is coupled to drive shaft 402 of tail rotor drive system 400, and may be coupled to a main rotor 106 of helicopter 100 in some embodiments.

The use of mechanical power transmission 114 within tail rotor drive system 400 allows tail rotor 108 to operate over a variable angle 414. When tail rotor 108 is oriented in first position 206 as illustrated in FIG. 2, tail rotor 108 may be used to perform a hover operation during flight operations. During flight operations, tail rotor 108 may be oriented in second position 302 to enable tail rotor 108 to provide forward thrust 304 to helicopter 100. Varying angle 414 of tail rotor 108 during flight operations enables different modes of flight capabilities for helicopter 100, which are not available when tail rotor 108 is fixed in a parallel orientation with respect to axis 204 of tail boom 104.

Although specific embodiments were described herein, the scope is not limited to those specific embodiments. Rather, the scope is defined by the following claims and any equivalents thereof.

What is claimed is:

1. A mechanical power transmission configured to install between a tail rotor and a drive shaft and pivot about an axis, the mechanical power transmission comprising:
    an input gear having an input shaft configured to couple to the drive shaft;
    an output gear having an output shaft configured to couple to the tail rotor;
    a first intermediate gear rotationally coupled to the input gear;
    a second intermediate gear rotationally coupled to the output gear;
    a shaft mechanically coupling the first intermediate gear with the second intermediate gear, wherein a centerline of the shaft is coincident with the axis; and
    a first housing and a second housing that each include a corresponding curved transverse element, the curved transverse elements covering distinct portions of a circumference of the shaft without overlapping, and wherein a combination of the first housing and the second housing is generally cylindrical.

2. The mechanical power transmission of claim 1, wherein:
    the mechanical power transmission is configured to pivot about the axis to move the output shaft between a first position that is perpendicular to the input shaft and a second position that is parallel to the input shaft.

3. The mechanical power transmission of claim 2, wherein:
    the centerline of the input shaft is parallel to the centerline of the output shaft while the output shaft remains at the second position.

4. The mechanical power transmission of claim 1, wherein:
    a centerline of the input shaft and a centerline of the output shaft are perpendicular to the axis.

5. The mechanical power transmission of claim 4, wherein:
    a separation between the centerline of the input shaft and the centerline of the output shaft is less than 7 inches.

6. The mechanical power transmission of claim 1, further comprising:
    a first bearing assembly that rotationally couples the input gear to the first housing; and
    a second bearing assembly that rotationally couples the first intermediate gear to the first housing.

7. The mechanical power transmission of claim 6, wherein:
    the second housing is rotationally coupled to the first housing and configured to pivot about the axis, the mechanical power transmission further comprising:
    a third bearing assembly that rotationally couples the output gear to the second housing; and
    a fourth bearing assembly that rotationally couples the second intermediate gear to the second housing.

8. The mechanical power transmission of claim 7, further comprising:
    a first bearing proximate to the first intermediate gear that rotationally couples the first housing to the second housing; and
    a second bearing proximate to the second intermediate gear that rotationally couples the first housing to the second housing.

9. A mechanical power transmission configured to install between a tail rotor and a drive shaft and pivot about an axis, the mechanical power transmission comprising:
    a first housing configured to fixedly mount to a tail boom;
    a second housing rotationally coupled to the first housing and configured to pivot about the axis, wherein the first housing and the second housing each include a corresponding curved transverse element, the curved transverse elements covering distinct portions of a circumference of an additional shaft without overlapping, wherein a combination of the first housing and the second housing is generally cylindrical; and an internal drive assembly disposed within the first housing and the second housing that is configured to rotatably couple the drive shaft to the tail rotor and that includes the additional shaft, wherein the additional shaft has a centerline coincident with the axis.

10. The mechanical power transmission of claim 9, wherein the internal drive assembly further comprises:
an input gear having an input shaft configured to couple to the drive shaft;
an output gear having an output shaft configured to couple to the tail rotor;
a first intermediate gear rotationally coupled to the input gear; and
a second intermediate gear rotationally coupled to the output gear; wherein
the additional shaft mechanically couples the first intermediate gear with the second intermediate gear.

11. The mechanical power transmission of claim 10, further comprising:
a first bearing assembly that rotationally couples the input gear to the first housing; and
a second bearing assembly that rotationally couples the first intermediate gear to the first housing.

12. The mechanical power transmission of claim 11, further comprising:
a third bearing assembly that rotationally couples the output gear to the second housing; and
a fourth bearing assembly that rotationally couples the second intermediate gear to the second housing.

13. The mechanical power transmission of claim 12, further comprising:
a first bearing proximate to the first intermediate gear that rotationally couples the first housing to the second housing; and
a second bearing proximate to the second intermediate gear that rotationally couples the first housing to the second housing.

14. A tail boom of a helicopter, the tail boom comprising:
a drive shaft having a first end and a second end; and
a mechanical power transmission configured to pivot about an axis, the mechanical power transmission comprising:
an input gear having an input shaft coupled to the second end of the drive shaft;
an output gear having an output shaft configured to couple to a tail rotor;
a first intermediate gear rotationally coupled to the input gear;
a second intermediate gear rotationally coupled to the output gear;
a shaft mechanically coupling the first intermediate gear with the second intermediate gear, wherein a centerline of the shaft is coincident with the axis; and
a first housing and a second housing that each include a corresponding curved transverse element, the curved transverse elements covering distinct portions of a circumference of the shaft without overlapping, wherein a combination of the first housing and the second housing is generally cylindrical.

15. The tail boom of claim 14, wherein:
the mechanical power transmission is configured to pivot about the axis to move the tail rotor between a first position that is parallel to the tail boom and a second position that is perpendicular to the tail boom.

16. The tail boom of claim 14, wherein:
a centerline of the input shaft and a centerline of the output shaft are perpendicular to the axis.

17. The tail boom of claim 16, wherein:
a separation between the centerline of the input shaft and the centerline of the output shaft is less than 7 inches.

18. The tail boom of claim 14, wherein the mechanical power transmission further comprises:
a base member fixed to the tail boom;
a first housing fixed to the base member and the tail boom;
a first bearing assembly that rotationally couples the input gear to the first housing; and
a second bearing assembly that rotationally couples the first intermediate gear to the first housing.

19. The tail boom of claim 18, wherein the mechanical power transmission further comprises:
a second housing rotationally coupled to the first housing and configured to pivot about the axis;
a third bearing assembly that rotationally couples the output gear to the second housing; and
a fourth bearing assembly that rotationally couples the second intermediate gear to the second housing.

20. The tail boom of claim 19, wherein the mechanical power transmission further comprises:
a first bearing proximate to the first intermediate gear that rotationally couples the first housing to the second housing; and
a second bearing proximate to the second intermediate gear that rotationally couples the first housing to the second housing.

* * * * *